March 17, 1925.
W. B. RIGBY
TREE FELLING JACK
Filed July 17, 1924      2 Sheets-Sheet 1
1,529,814
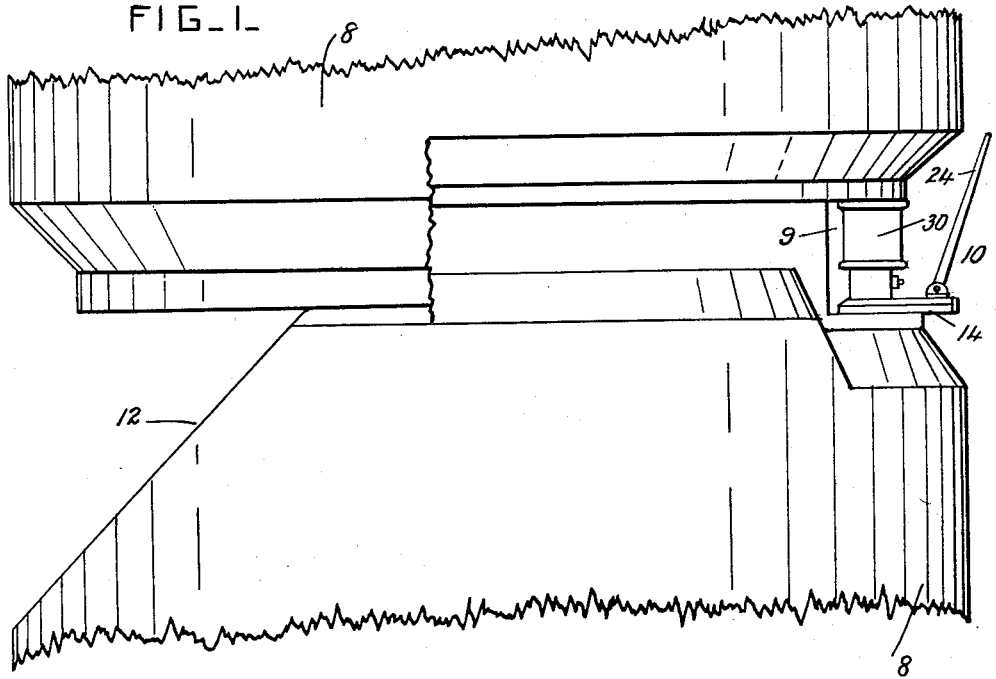
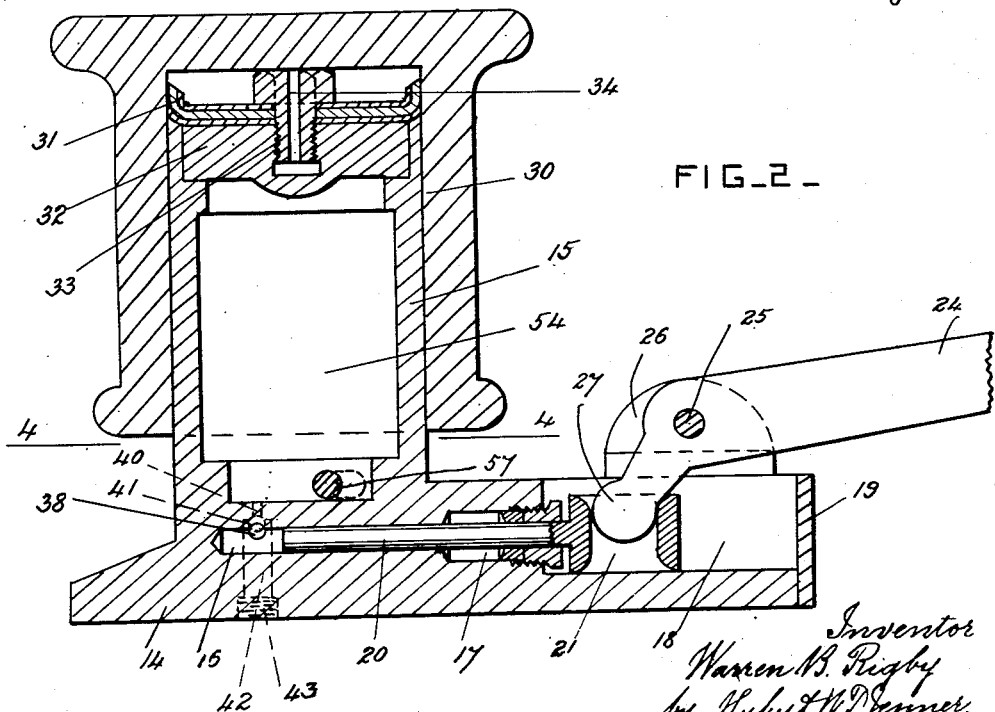
Inventor
Warren B. Rigby
by Robert W. Jenner
Attorney March 17, 1925.  1,529,814
W. B. RIGBY
TREE FELLING JACK
Filed July 17, 1924   2 Sheets-Sheet 2
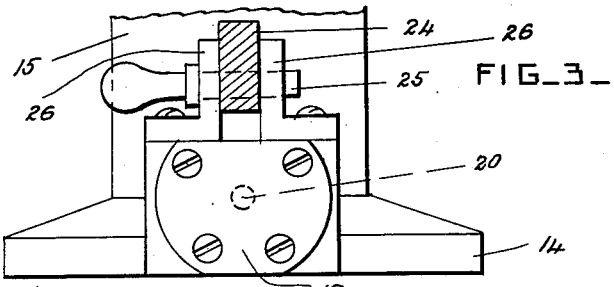
FIG_3_
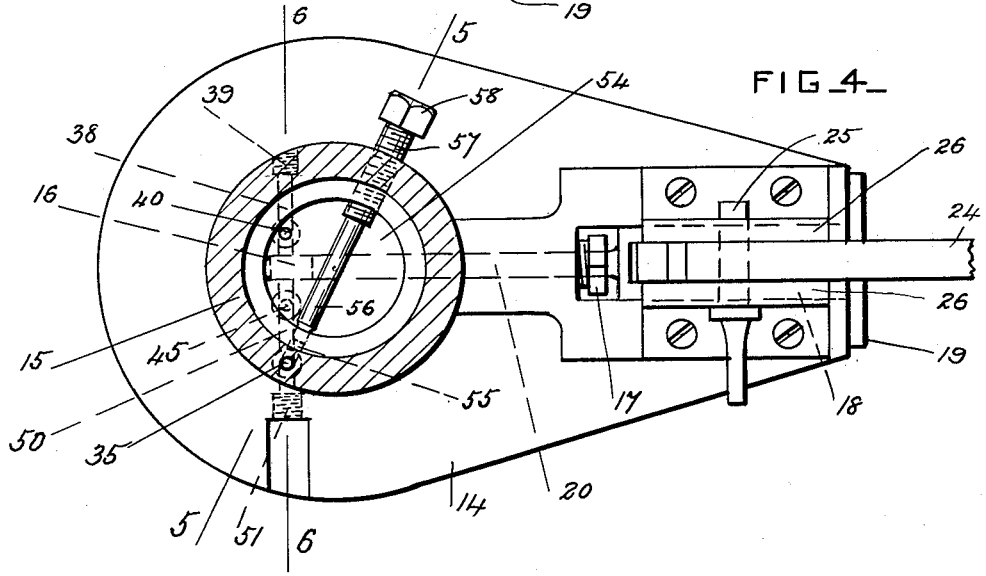
FIG_4_
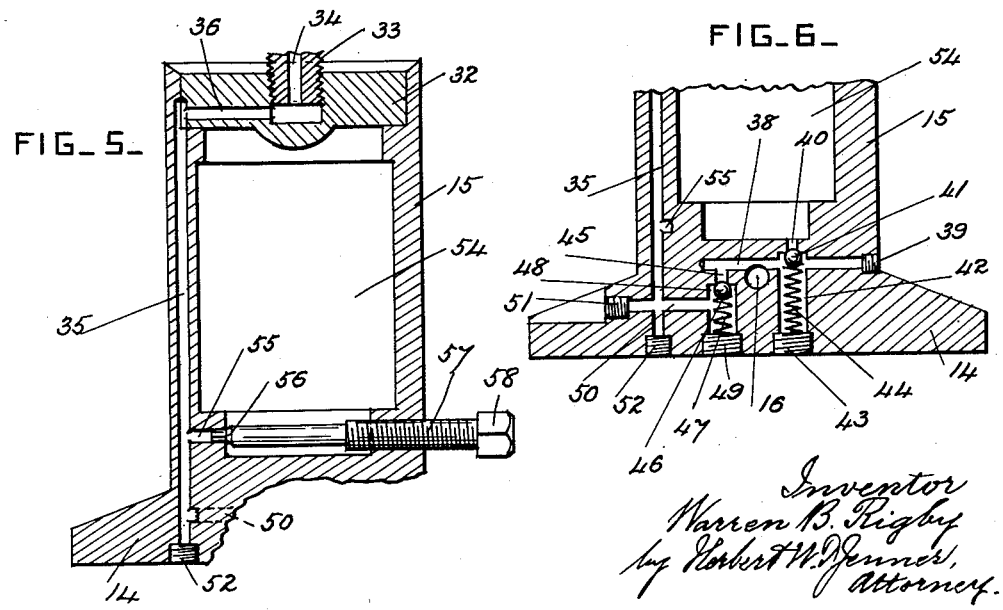
FIG_5_    FIG_6_
Inventor
Warren B. Rigby
by Herbert W. Jenner
Attorney.

Patented Mar. 17, 1925.

1,529,814

UNITED STATES PATENT OFFICE.

WARREN B. RIGBY, OF ARCATA, CALIFORNIA.

TREE-FELLING JACK.

Application filed July 17, 1924. Serial No. 726,560.

*To all whom it may concern:*

Be it known that I, WARREN B. RIGBY, a citizen of the United States, residing at Arcata, in the county of Humboldt and State of California, have invented certain new and useful Improvements in Tree-Felling Jacks, of which the following is a specification.

This invention relates to hydraulic jacks, specially intended for use in felling trees, but which may be used for other purposes; and it consists in the novel construction and combination of the parts hereinafter fully described and claimed.

In the drawings, Figure 1 is a side view of a portion of a tree, showing the use of the jack. Fig. 2 is a vertical section through a jack constructed according to this invention and drawn to a larger scale. Fig. 3 is an end view of the base of the jack, looking from the right in Fig. 2. Fig. 4 is a plan view of the base of the jack, taken in section on the line 4—4 in Fig. 2. Fig. 5 is a section through the upper part of the jack, taken on the line 5—5 in Fig. 4. Fig. 6 is a section through the lower part of the jack, taken on the line 6—6 in Fig. 4.

In felling heavy trees, such as the giant redwood trees of California, this jack takes the place of wedges as ordinarily used to raise the tree somewhat in order to relieve the saw and prevent binding, and also to start the falling of the tree after the saw has approached sufficiently near to the undercut. The tree 8 has a saw-cut 9 on one side, and is suitably trimmed and grooved to receive one or more jacks 10, as shown in Fig. 1. On the other side of the tree, opposite the jack, an undercut 12 is either sawn out or chopped out before the felling saw is started. The tree falls on the side of the undercut 12, and when two jacks are used the tree may be thrown a little out of the direct line it is naturally inclined to follow, if desired.

This is an advantage, as heavy redwood trees have to be felled in such a manner as not to break on reaching the ground. A bed of small fallen trees is prepared for the large tree to fall on, and the large tree can be thrown onto the exact spot prepared for it. The jack is provided with a base 14, and a hollow ram 15 is arranged to project upwardly from one end portion of the base. A pump cylinder 16 is bored horizontally in the base under the ram, and is provided with a stuffing-box 17 at its outer end. A guide slot or channel 18 is formed in the base beyond the stuffing-box, and its outer end is closed by a plate 19. A pump plunger 20 is slidable in the cylinder 16, and has a slotted crosshead 21 which is slidable in the guide slot 18. An operating lever 24 is pivoted by a pin 25 in bearings 26 secured to the base, and has a short arm 27 which engages with the slotted crosshead.

A jack cylinder 30 is slidable vertically over the ram 15, and the ram 15 is provided with a packing 31 of any approved sort. The top end of the ram is closed by a plug 32, and the screw 33 which holds the packing in place has a small passage 34, and is screwed into a hole in the said plug. A vertical passage 35 is drilled in the side wall of the ram, and a cross passage 36 is provided in the plug to connect the top of the passage 35 with the space in the screwthreaded hole in the plug below the screw 33.

A cross passage 38 is drilled in the base which intersects the closed end portion of the pump cylinder 16, and its outer end is closed by a plug 39. A vertical inlet port 40 connects the hollow ram with the cross passage 38, and 41 is the inlet valve which normally closes the inlet port 40.

The inlet valve works in a chamber 42 drilled upwardly in the base and closed by a plug 43. The inlet valve is pressed on its seat by a spring 44 which is inclosed in the chamber 42. The inner end portion of the cross passage 38 has a vertical outlet port 45 which is normally closed by a valve 46 which is pressed on its seat by a spring 47. The outlet valve and its spring are arranged in a chamber 48 drilled upwardly in the base and closed by a plug 49 at its bottom end. The outlet valve chamber 48 is connected with the lower end portion of the vertical passage 35 by a cross passage 50 the outer end of which is closed by a plug 51. The bottom end of the vertical passage 35 is closed by a plug 52.

The valves shown are ball valves, but any other approved form of valve can be used in carrying out this invention. The pump cylinder can be drilled in the metal of the base as shown, or the pump cylinder may be any approved form of cylinder or bushing inserted in a cylindrical hole drilled in the base.

The hollow ram forms the reservoir 54 for the fluid used in the pump. An exhaust passage 55 is drilled in the side wall of the ram, and connects its interior space 54 with the vertical passage 35. An exhaust valve 56 is provided for closing the passage 55, and its stem has a screwthreaded portion 57 which is screwed into a hole in the side of the ram, and provided with a head or handle 58 for operating the valve.

The jack is made as short as possible, and the pump cylinder is formed under the ram and is arranged radially of its axis. The cross passage 38 is arranged at a right angle to the pump cylinder and to one side of the axis of the ram. The exhaust valve is arranged crosswise over the axis of the ram, and at an angle to the axis of the pump, and also at an angle to the axis of the cross passage 38, so that both the cross passage 38 and the exhaust passage 55 may communicate with the vertical passage 35 which conducts the fluid to and from the jack cylinder.

What I claim is:

1. In a hydraulic jack, a base having a vertical ram at one end, and a jack cylinder slidable over the ram, said base having a pump cylinder arranged horizontally in it under the said ram, said ram and base having also ports and passages provided with a delivery valve and connecting the inner end portion of the pump cylinder with the jack cylinder, and a pump plunger slidable in the pump cylinder.

2. In a hydraulic jack, a base having a vertical ram at one end, and a jack cylinder slidable over the ram, said base having a pump cylinder arranged horizontally in it under the said ram, said ram having a vertical passage in its side wall which communicates with the jack cylinder, and said base having also ports and passages provided with a delivery valve arranged on one side of the axis of the ram and connecting the inner end portion of the pump cylinder with the said vertical passage in the ram, and a pump plunger slidable in the pump cylinder.

3. A hydraulic jack as set forth in claim 2, the said ram being hollow and forming a reservoir for the pump, and being provided with an exhaust valve and an exhaust passage arranged radially of the axis of the ram and at an angle to the axis of the pump cylinder and operating to admit exhaust fluid from the said vertical passage in the ram to the pump reservoir, and the said base having also an inlet passage provided with an inlet valve and connecting the pump reservoir with the pump cylinder.

4. In a hydraulic jack, a hollow vertical ram having a vertical passage in its side wall, a plug closing the top of the ram and having a screwthreaded hole at its axis and a cross passage connecting the bottom of the said hole with the said vertical passage in the ram, a jack cylinder slidable over the ram, packing for the ram in the jack cylinder, and a screw engaging with the screwthreaded hole in the said plug and securing the packing to the ram and having a passage which communicates with the said cross passage and with the jack cylinder.

5. In a hydraulic jack, a hollow vertical ram having a vertical passage in its side wall, said ram having a base provided with a horizontal pump cylinder, the said base having also a cross passage the middle portion of which communicates with the pump cylinder, said base having also two vertical valve chambers and an inlet port and an outlet port which ports communicate with the respective ends of the cross passage, an inlet valve in one valve chamber normally closing the said inlet port which also communicates with the hollow ram, an outlet valve in the other valve chamber and normally closing the said outlet port, said base having also a cross passage communicating with the outlet valve chamber and the vertical passage in the ram, and a pump plunger slidable in the pump cylinder.

In testimony whereof I have affixed my signature.

WARREN B. RIGBY.